United States Patent [19]
Kawada

[11] 3,790,826
[45] Feb. 5, 1974

[54] HIGH VOLTAGE GENERATING DEVICE HAVING AN OPERATIONAL MONITORING DEVICE

[75] Inventor: Takehiko Kawada, Yokohama, Japan

[73] Assignee: Denki Onkyo Co., Ltd., Tokyo, Japan

[22] Filed: Dec. 19, 1972

[21] Appl. No.: 316,474

[30] Foreign Application Priority Data
Dec. 23, 1971 Japan .................. 47-1306

[52] U.S. Cl. ................................. 310/8.1
[51] Int. Cl. ............................. H04r 17/00
[58] Field of Search ........... 310/8, 8.1, 9.7, 9.8, 9.1

[56] References Cited
UNITED STATES PATENTS

| | | | |
|---|---|---|---|
| 2,975,354 | 3/1961 | Rosen | 310/8.1 X |
| R17,359 | 7/1929 | Cady | 310/8.1 X |
| 2,440,709 | 5/1948 | Young | 310/8.1 |
| 1,817,030 | 8/1931 | Eberhard | 310/8.1 X |
| 3,662,194 | 5/1972 | Moriki | 310/9.8 X |
| 3,694,674 | 9/1972 | Inoue | 310/9.8 X |
| 2,747,090 | 5/1956 | Cavalieri, Jr. et al. | 310/8.1 UX |

*Primary Examiner*—J. D. Miller
*Assistant Examiner*—Mark O. Budd
*Attorney, Agent, or Firm*—Armstrong & Wegner

[57] ABSTRACT

A high voltage generating device consisting of a ceramic transformer and a drive power source, said ceramic transformer being composed of a drive portion and electrical generating portion integral therewith and said drive power source being adapted to supply a drive voltage to said drive portion. This high voltage generating device is provided with a novel operational monitoring device which is adapted to operate for identifying the normal operation of said ceramic transformer by using the voltage induced to an electrical receiving unit located in the close vicinity of said electrical generating portion of said transformer.

21 Claims, 7 Drawing Figures

HIGH VOLTAGE GENERATING DEVICE HAVING AN OPERATIONAL MONITORING DEVICE

BACKGROUND OF THE INVENTION

This invention relates to a high voltage generating device featuring a novel operational monitoring device for use in a ceramic transformer and more particularly to an operational monitoring device which is adapted to indicate whether the operation of the ceramic transformer is in a normal condition or not.

Conventionally, a ceramic transformer consists of: a plate formed of sintered piezo-electric material; a pair of drive electrodes provided on the opposite surfaces of a substantially half portion of said plate which serves as a drive portion thereof; and an output electrode provided on the edge face of the other half of said plate, the other half of said plate serving as an electrical generating portion. Thus, when resonance is caused to said plate by applying to the drive electrode a drive voltage having a frequency exactly or substantially the same as the inherent or natural mechanical oscillation frequency of said plate, an increased higher output voltage can be taken from the output electrode of the electrical generating portion. Normally, the output voltage thus taken out is rectified through a rectifying circuit and then fed to a load. In this respect, when the load is brought into a short-circuited condition, there will result a lowered voltage which is taken from the output electrode of said electrical generating portion, because of the high output impedance of the ceramic transformer. It follows then that, when the ceramic transformer is used as a high voltage generating device for a television receiver, a small size electric dust collector, an electro-static painting device or the like, there is experienced such drawbacks in that it is not possible to detect whether the output voltage is being generated at the output electrode, despite that the drive voltage is being impressed to the drive electrode of the ceramic transformer, thus presenting a danger to the operator of inadvertent receiving electric shocks. Furthermore, even when the output voltage is not generated in the ceramic transformer, it is not possible to detect whether the ceramic transformer is, or has been subjected to failure.

Hitherto, the short-circuiting of the load incorporated in a high voltage generating device using a coil type transformer can be detected with resort to an excessive electrical current caused by the short-circuiting of the load. However, this sort of circuit as used therein is only adaptable for use with the coil type transformer which will permit the supply of a great amount of electrical current in the case of short-circuiting, whereas such a circuit is not applicable to a high voltage generating device such as a ceramic transformer having a high output impedance.

SUMMARY OF THE INVENTION

It is accordingly a principal object of the invention to provide a novel operational monitoring device for use in a ceramic transformer used with a high voltage generating device.

It is a further object of the invention to provide an operational monitoring device of this kind without affecting the operation of the ceramic transformer.

It is another object of the invention to provide an operational monitoring device of this kind which permits an indication of the operational behaviour of the ceramic transformer by means of a simple circuit construction.

It is a further object of the invention to provide an operational monitoring device of this kind which is adapted to detect and indicate the fluctuation in the output voltage from the ceramic transformer without separately taking out the output voltage therefrom.

It is a further object of the invention to provide an operational monitoring device of this kind which is adapted to detect and indicate the operating voltage in the electrical generating portion of the ceramic transformer, without providing the electrical generating portion with an auxiliary electrode.

It is still a further object of the invention to provide an operational monitoring device of this kind which permits visual identification of the operational behaviour of the ceramic transformer.

According to the advantageous aspects of the operational monitoring device of the ceramic transformer of the present invention, an electrical receiving unit is provided in the close vicinity of the electrical generating portion of said ceramic transformer, said electrical receiving unit being in connection with said indicating device, thereby being able to identify the normal operation of the ceramic transformer.

DESCRIPTION OF THE PREFERRED EMBODIMENT

Figure 1:
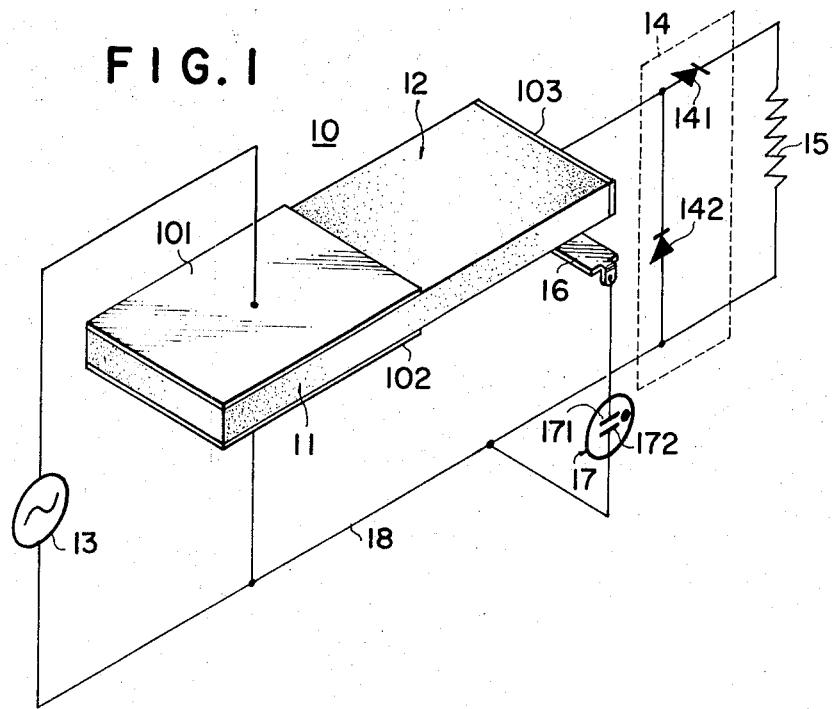
FIG. 1 is an outline of a high voltage generating device using a ceramic transformer embodying the present invention.

Referring now to FIG. 1, a ceramic transformer 10 consists of a pair of drive electrodes 101 and 102 provided on the opposite surfaces of the half portion of the ceramic plate constituting a drive portion 11 of the ceramic transformer; and an output electrode 103 provided on the edge face of the other half portion of said plate which serves as an electrical generating portion 102 of said transformer 10. In this arrangement, an A.C. drive voltage having a frequency exactly or substantially the same as the inherent or natural oscillation frequency of the ceramic plate, is applied to the drive electrodes 101 and 102 from a drive power source 13. The increased output voltage in the ceramic transformer is fed from the output electrode 103 to a rectifying circuit 14. The rectifying circuit 14 is comprised of diodes 141 and 142, forming a half-wave rectifier presenting a voltage twice that of the aforesaid increased voltage. The D.C. high voltage from the rectifying circuit 14 is fed to a load means 15.

The operational monitoring device embodying the present invention consists of: an electrical receiving unit 16 arranged in parallel to and in the close vicinity of the electrical generating portion 12 of the ceramic transformer; and an indicating means 17 connected to said electrical receiving unit and the ground 18 therebetween. The electrical receiving unit 16 is composed of a conductive plate, and the voltage is induced thereto from the electrical generating portion 12. The level of the A.C. voltage to be induced in the electrical receiving unit or conductor plate 16 is dependent on the area of the conductor plate 16 facing the surface of the electrical generating portion, the distance of the conductor plate 16 from the electrical generating portion 12 and the relative position of the conductor plate 16 between the drive electrodes 101/102 and the output electrode 103. Provided with an indicating device 17 is a glow discharge tube such as a neon tube which is adapted to glow when voltage is applied thereto, thus permitting an operator to have direct visual identification during the normal operation of the device.

With this arrangement, when the drive voltage is applied to the drive electrodes 101 and 102 of the ceramic transformer 10 from the drive power source 13, then the ceramic transformer will oscillate, while an increased high voltage output is obtained from the output electrode 103. In this respect, an A.C. voltage lower than the output voltage will be induced to the conductor plate 16, thus causing the neon tube 17 to glow. In the normal operational condition, when the load means 15 is short-circuited, the voltage in the output electrode 103 of the ceramic transformer becomes closer to the potential of the ground. This lowers the A.C. voltage to be induced to the conductor plate 16, thus turning off the neon tube 17, and thus indicating an abnormal condition. Furthermore, when the ceramic transformer 10 is subjected to failure, the neon tube will cease glowing, thus indicating an abnormal condition which can be discerned by the operator.

The level of the voltage to be generated in the ceramic transformer 10 as shown in FIG. 1 will gradually increase as the drive electrodes 101 and 102 come closer to the output electrode 103. For this reason, the conductor plate 16 to be located in the close vicinity of the electrical generating portion should preferably be located as close as possible to, but along the length of, the drive electrode to prevent discharging from the output electrode.

Figure 2:
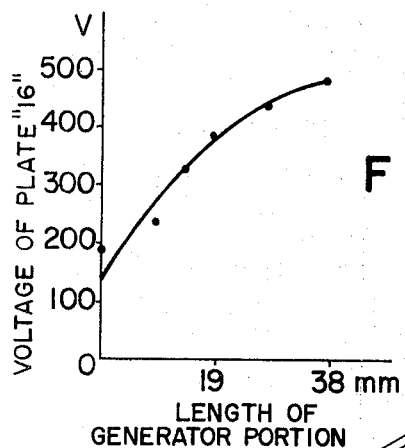
FIG. 2 is a plot showing one example of A.C. voltages induced to the electrical receiving unit located in the close vicinity of the ceramic transformer.

FIG. 2 is a plot showing the measurements of the A.C. voltages induced to the conductor plate 16 by using such a circuit as is shown in FIG. 1. In this example, a ceramic transformer 76 mm long, 20 mm wide and 5 mm thick, with the electrical generating portion being 38 mm long, was used under the conditions of drive frequency of 48.12 KHz with load resistance of 20 MΩ and the voltage at the opposite edges of the load being 8 KV, while a conductor plate 16, 18 mm long and 5 mm wide was shifted in parallel to the electrical generating portion 12 with the spacing of said plate 16 from the electrical generating portion 12 maintained to 5.5 mm. The plot as shown in FIG. 2 indicates the relationship in which the voltage to be induced to the conductor plate 16 will increase as the conductor plate 16 comes closer to the output electrode 103.

Figure 3:
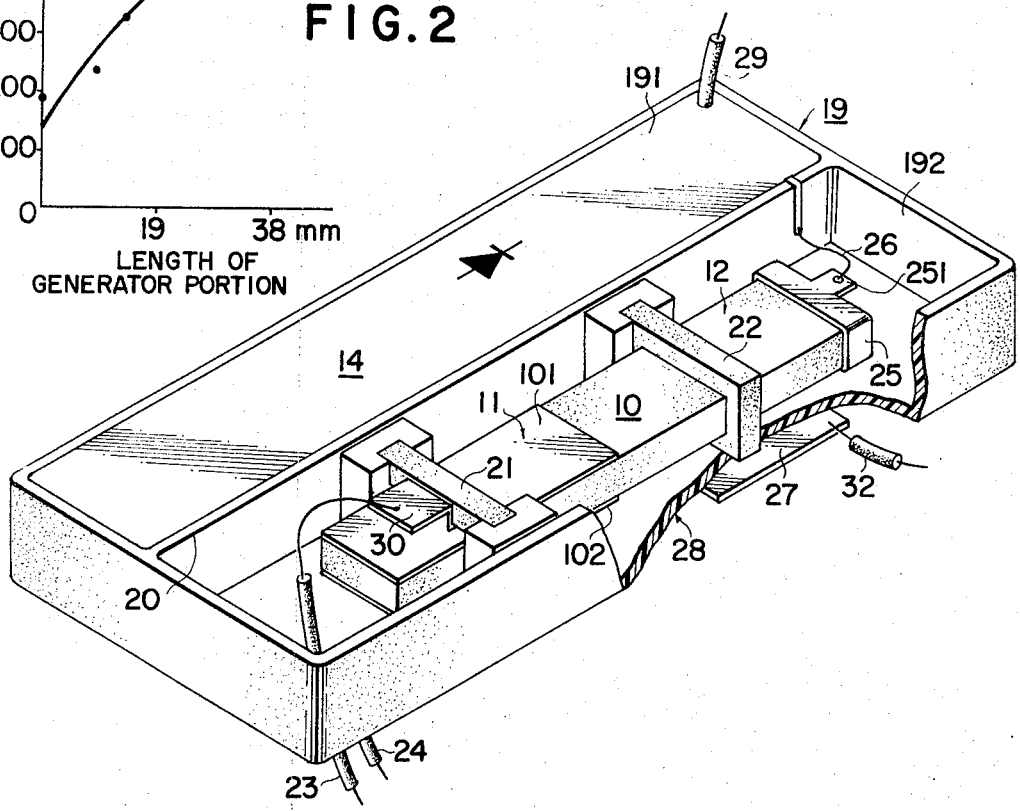
FIG. 3 is a perspective view showing the arrangement in which the electrical receiving unit for use in the operational monitoring device is located on the back surface of a casing housing the ceramic transformer therein, being arranged in opposing relation to the electrical generating portion of said ceramic transformer.

FIG. 3 shows the ceramic transformer housed in a casing 19. The casing 19 is divided into two compartments 191 and 192 by a partition wall 20, with a rectifying circuit 14 positioned in the compartment 191, being sealed with silicon rubber. Housed in the compartment 192 is a ceramic transformer 10 supported by holders 21 and 22 at the nodal point of the oscillation. Provided underside of the holder 21 supporting the drive portion 11 thereon is a plate terminal 30, 30, to which are connected lead wires 23 and 24 and which contact the drive electrodes 101 and 102, respectively. Surrounding the output electrode is a cap 25 made of an electrically conductive rubber. A flexible piece 251 extended therefrom is connected via a lead wire 26 to the rectifying circuit 14 having an output lead wire 29 connected thereto. A conductor plate 27 facing the electrical generating portion 12 of the ceramic transformer is secured positively to the back surface 28 of the casing 19.

Figure 4:
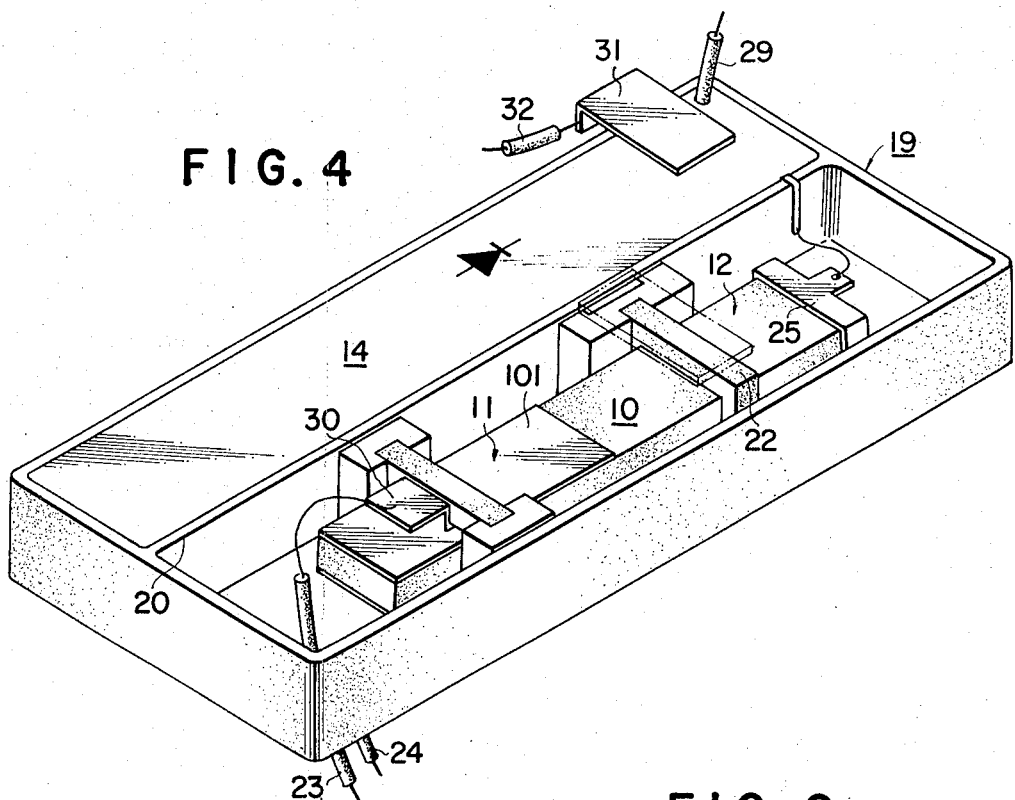
FIG. 4 is a perspective view showing another arrangement in which the electrical receiving unit is affixed to the holder on the electrical generating portion side, said holder being adapted to support the ceramic transformer housed in said casing.

FIG. 4 is a modification of the embodiment of FIG. 3. The similar reference numerals represent similar parts throughout FIGS. 3 and 4. In this embodiment, a conductor plate 31 is positioned on the holder 22 as shown by the broken line, being spaced at a predetermined distance from the surface of the electrical generating portion 12.

Figure 5:
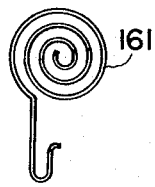
FIG. 5 is a plan view of the electrical receiving unit for use with the operational monitoring device of the invention.

FIG. 5 shows another modification of the conductor plate 16, which consists of a winding 161 having several turns of lead wires. In this case, the voltage to be induced will be lowered.

Figure 6:
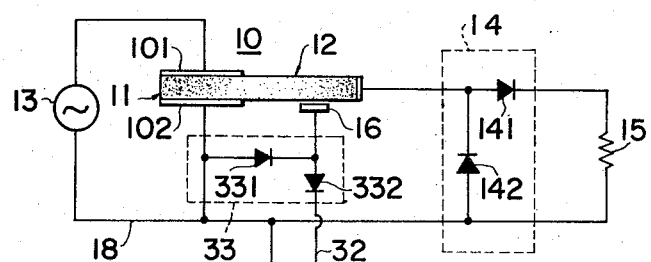
FIG. 6 is a wiring diagram showing the combination of the operational monitoring device incorporated in the device of FIG. 1 and a rectifying circuit connected thereto.

FIG. 6 shows an improved embodiment of the device of FIG. 1. Since voltage with a high frequency is induced to the conductor plate 16 from the ceramic transformer 10, the voltage to be fed to the discharge tube 17 will be lowered due to the distribution capacity of the lead wires, in the case where the lead wire 32 is extended to a length up to the glow discharge tube 17, such that the discharge tube 17 fails to glow. In such a case, the rectifying circuit 33 is arranged, as shown in FIG. 6, as close to the conductor plate 16 as possible yet between the conductor plate 16 and the glow discharge tube 17. The rectifying circuit 33 is formed as a voltage doubling rectifying circuit by using diodes 331 and 332. However, an alternative circuit other than the aforesaid rectifying circuit 33 may be used. Also, a volt-meter as shown by the dotted line in FIG. 6 may be used in place of the glow discharge tube 17. In this case, the electrical current to be induced to the conductor plate 16 will be greatly decreased, such that there should be used a volt-meter such a vacuum tube type volt-meter 34 having a greater internal impedance. Thus, a point of such a meter indicates a given value during the normal operation of the ceramic transformer 10.

Figure 7:
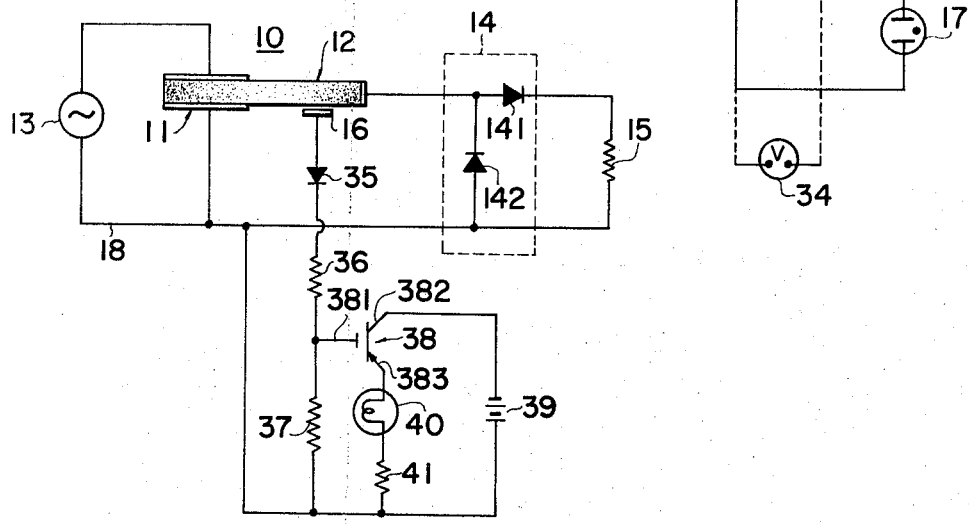
FIG. 7 is a wiring diagram showing the combination of the operational monitoring device incorporated in the device of FIG. 1 and a field effect transistor (F E T) circuit connected thereto.

FIG. 7 shows another improved embodiment of the device of FIG. 1. A diode 35 is connected to the conductor plate 16, while a series circuit consisting of resistors 36 and 37 is connected to the diode 35 and the ground 18 therebetween. Connected to the junction of the resistors 36 and 37 is a gate 38 of a field effect transistor 38, while the negative pole of a D.C. electrical power source 39 is connected to a source 382. The positive pole of the power source 39 is grounded. Connected in series for grounding to a drain 383 of the field effect transistor 36 are a lamp 40 and a resistor 41.

With this arrangement, as long as the ceramic transformer operates normally, a high control voltage will be fed to the gate of the field effect transistor 38. In this case, the transistor will be turned on so as to cause the lamp 40 to glow. When the A.C. voltage to be induced to the conductor plate 16 is lowered due to an abnormal condition in the ceramic transformer, then the transistor 38 will be turned off so as to turn off the lamp 40.

From the above description of the invention in its preferred form, it will be apparent that the same fulfills all the objects of the invention described previously, and while the invention has been illustrated and described in considerable detail, the same is subject to alteration and modification without departing from the underlying principles involved, and, accordingly, protection should not be limited to the specific details illustrated and described, except as may be necessitated by the appended claims.

What is claimed is:

1. A high voltage generating device comprising
   a. a ceramic transformer including a ceramic plate having a drive portion and an electrical generating portion; a pair of drive electrodes on said plate; and an output electrode on the edge face of said electrical generating portion of said plate;
   b. power supply means for applying an ac drive voltage to said drive electrodes;
   c. receiving means, positioned in the vicinity of but not in direct physical contact with the surface of said electrical generating portion, said receiving means having a voltage induced therein said voltage corresponding to the output voltage of said device; and
   d. indicating means, coupled to said receiving means, for producing output indicative of the abnormal operation of said device.

2. A device as set forth in claim 1, wherein said receiving means is an electrically conductive piece.

3. A device as set forth in claim 2, wherein said conductive piece is provided in the form of a conductor plate, whose surface faces the surface of the electrical generating portion of the ceramic transformer.

4. A device as set forth in claim 3, wherein said conductive piece is a coil formed of a lead wire.

5. A device as set forth in claim 4, wherein said coil is wound within a plane and arranged in an opposing relation to the surface of said electrical generating portion.

6. A device as set forth in claim 1, wherein said indicating means is such that the abnormal operation of said ceramic transformer can be identified visually by the operator.

7. A device as set forth in claim 6, wherein said indicating indicating means is a glow discharge tube.

8. A device as set forth in claim 7, wherein said glow discharge tube is a neon tube.

9. A device as set forth in claim 7, wherein said indicating means is a volt-meter.

10. A device as set forth in claim 9, wherein said volt-meter has a high internal impedance.

11. A device as set forth in claim 10, wherein said volt-meter is a vacuum tube volt-meter.

12. A device as set forth in claim 2, wherein said device includes a casing adapted to house said ceramic transformer therein and holders adapted for affixing to both the drive portion and the electrical generating portion of said transformer to thereby positively support said transformer and wherein said conductive piece is rigidly secured via an insulating wall to said casing.

13. A device as set forth in claim 12, wherein said conductive piece is rigidly secured to the outer surface of said casing.

14. A device as set forth in claim 2, wherein said device includes a casing adapted to house the ceramic transformer therein and holders secured to both the drive portion and the electrical generating portion of said transformer so as to positively support said transformer within the casing and wherein said conductive piece is secured to said holders.

15. A high votlage generating device comprising:
    a. a ceramic transformer including a ceramic plate having a drive portion and an electrical generating portion;
       a pair of drive electrodes on the surface of said drive portion of said plate; and
       an output electrode on the edge surface of said electrical generating portion of said plate;
    b. power supply means for applying an ac drive voltage to said drive electrodes;
    c. a conductive means spaced a predetermined distance from said electrical generating portion, adapted to have an ac voltage from said generating portion induced therein;
    d. rectifying means coupled to said conductive means for rectifying said induced voltage; and
    e. indicating means coupled to said rectifying means for receiving said rectified voltage and for producing an indication of an abnormal operation of said device.

16. A device as set forth in claim 1, wherein said rectifying means is a half wave rectifying circuit.

17. A device as set forth in claim 15, wherein said rectifying means is a full wave rectifying circuit.

18. A device as set forth in claim 1, wherein said rectifying means is a voltage-multiplying circuit.

19. A device as set forth in claim 18, wherein said voltage multiplying circuit is a voltage-doubling rectifying circuit.

20. A device as set forth in claim 15, wherein said indicating means includes: a field effect transistor adapted to operate by virtue of the voltage being applied from said rectifying means; a dc electrical power source connected to said transistor; and a lamp adapted to glow by means of an electrical current from said dc power source when said transistor is in a conductive state.

21. A device as set forth in claim 20, wherein said transistor is connected to the junction of two resistors connected in series between said rectifying means and the ground.

* * * * *